United States Patent Office 2,938,779
Patented May 31, 1960

2,938,779
JET FUEL

John J. Kolfenbach, North Plainfield, and Theodore B. Wasserbach, Cranford, N.J., assignors to Esso Research and Engineering Company, a corporation of Delaware No Drawing. Filed Aug. 11, 1955, Ser. No. 527,888

5 Claims. (Cl. 52—.5)

The present invention concerns fuel compositions that contain liquid hydrocarbon fuels and finely divided particles of a combustible solid which is a member of the class of solids consisting of magnesium, aluminum and carbon. The fuel compositions themselves are further characterized by the fact that they contain carbon blacks of high structure index that serve to maintain the combustible solid particles within the hydrocarbon fuels in the form of stable suspensions. The carbon blacks that have been found to be particularly suitable for this purpose are the so-called structure blacks or structure carbons, especially acetylene black.

This is a continuation-in-part of our copending application S.N. 334,363 filed January 30, 1953, now abandoned.

Petroleum hydrocarbons have been widely used as fuels for the generation of heat and power. For example, gasoline and diesel fuel as derived from petroleum are extensively employed in internal combustion engines. Liquefied petroleum gas, kerosene, light fuel oil, heavy fuel oil and residual fuel oil have likewise found widespread use as domestic and industrial sources of heat. In recent years, new forms of engines such as jet engines and rocket engines have been developed and have been found to best utilize fuels that have somewhat different characteristics than the ones just mentioned. In the operation of jet aircraft, for example, conventional petroleum fuels such as kerosenes and gasolines, have been reasonably satisfactory as primary fuels; but they are still not completely satisfactory, especially as "afterburner" fuels. Likewise, in the operation of rocket engines, conventional petroleum fuels leave much to be desired.

Accordingly, it is an object of the present invention to provide improved hydrocarbon-type fuels for use in rockets and jet aircraft engines. In the latter instance, it is a particular object to provide hydrocarbon-type fuels that are especially well adapted for use as "afterburner" fuels.

In order to best describe the present invention, it is felt desirable to first briefly describe the construction and operation of jet aircraft engines and rockets.

Referring first to jet aircraft engines, it will be recalled that there are three basic types of jet engines—the ramjet, the turbo-jet, and the turbo-prop. The ram-jet type will also be considered to include the pulse-jet type of engine.

All of the various jet engines operate in the same basic manner, and all of them contain at least the following sections:

(1) An air entrance section
(2) A combustion section
(3) A tailpipe section

Air enters a jet engine through the air entrance section and is burned with a suitable fuel in the combustion section. From the combustion section, the fuel combustion products and any excess air are vented through the tailpipe section. The thrust generated by the engine is related to the mass and velocity of the various gases passing through the engine.

The turbo-jet and turbo-prop engines differ from the ram-jet engine in that they contain a compressor section positioned between the air entrance and combustion sections and a turbine section positioned between the combustion and tailpipe sections. In addition, these two types of engines are also conventionally equipped with a set of fuel nozzles in the tailpipe section for the purpose of augmenting the thrust normally developed by these engines. This type of thrust augmentation is generally referred to as "tailpipe burning."

The "tailpipe burning" method of thrust augmentation makes use of the fact that, generally speaking, much more air passes through the combustion section of a jet engine than is required for the combustion of a fuel injected therein. One reason for this excess of air lies in the fact that the temperature of the gases leaving the combustion section must not exceed the value or level permitted by the metals present in the turbine section. At the present time, the turbine sections of most jet engines are not operated at temperatures above about 1400° to 1500° F. (average); and the air/fuel ratios therefore are as much as 50/1 or more. With different metals, it is contemplated that temperatures in excess of 1400°–1500° F., and air/fuel ratios considerably lower than the ones employed at present will be possible. But even then it is highly improbable that all of the oxygen in the air passing through a jet engine will ever be consumed in the combustion section.

In the tailpipe section, temperature is not considered to be too serious a problem. Hence, it is common practice to burn additional fuel in this section whenever additional bursts of thrust are required. For this purpose, it is considered that a fuel should have:

(1) A high heat of combustion per pound of oxygen consumed;
(2) A high weight of fuel burned per pound of oxygen for maximum mass flow; and
(3) A small volume of fuel per pounds of oxygen consumed so that a given volume of fuel would last longer.

A number of fuels have been proposed for use in afterburners. For example, it has been suggested that powdered magnesium be suspended in conventional jet fuels to form a slurry or semi-fluid mass. As yet, however, attempts along this line have not been entirely satisfactory because of inability to prepare stable magnesium slurries.

The present invention not only provides a fuel composition that meets with "afterburning" requirements, but also avoids the processing and quality problems that have been experienced up until now. Briefly, the fuel compositions of the present invention comprise three components: (1) a liquid hydrocarbon fuel; (2) particles of a combustible solid selected from the class consisting of aluminum, magnesium, and carbon; and (3) a carbon black of high structure index. The last named component may be one of a class of carbon blacks that are often referred to in the art as structure carbons or structure blacks.

The present fuel compositions generally possess a semifluid or gel-like structure in which the particles of combustible solid are uniformly suspended throughout the liquid hydrocarbon component by the structure black. The present fuel compositions are further characterized by a marked structural stability and uniformity over a wide range of temperatures. In addition, they possess flow characteristics that permit them to be transported by means of pumps, lines, etc.

The desired flow characteristics of the present fuel compositions are governed to a large extent by the type of equipment to be used in handling and burning them as well as the temperature conditions under which they are to be employed. But it has now been found that the flow characteristics and other physical properties of the compositions are primarily controlled by the amounts of structure black that are incorporated therein. The amounts of combustible solid have a relatively minor effect in comparison with the amounts of structure black.

In general, it is desirable to use an amount of structure black in the present fuel compositions such that the compositions take on a gel-like structure. This gel-like structure must be firm enough (1) to prevent any of the liquid hydrocarbon component from "bleeding" out of the structure, and (2) to prevent any of the particles of the combustible solid from settling within the structure. In addition, it is desired to avoid using so much of the structure black that the resulting fuel compositions are overly solid and therefore incapable of flow. In this connection, it is generally desirable to obtain fuel compositions that have a definite gel structure but that also have a penetration above about 330 mm./10 at the lowest temperature they are expected to encounter. The term "penetration" as used herein refers to the results obtained by using a standard penetrometer of the type described in ASTM Standard Test Method No. D-217.

In general, it has been observed that the present fuel compositions will possess satisfactory flow and structure characteristics over wide temperature ranges if they have penetration values above about 350 mm./10 @ 77° F. and particularly above 360 mm./10 @ 77° F. There is no particular limit upon the softness or upper level of penetration that the fuel compositions may possess so long as no "bleeding" or "settling" occurs.

The hydrocarbon component of the present fuel compositions may be any of the distillate liquid hydrocarbon fuel fractions that are derived from petroleum, coal, hydrocarbon synthesis processes, etc. Thus, the hydrocarbon component may be made up of distillate hydrocarbons boiling in the range of gasoline, kerosene, light fuel oil, etc.

For use in jet engine afterburners, it is preferred that the hydrocarbon component be derived from a petroleum fuel fraction and that it possess the following general properties:

(1) Flash Point—60° F. min.
(2) Sulfur content—0.4% max.
(3) Corrosion—No corrosion of Cu in 3 hrs. at 210° F.
(4) Final Boiling Point—600° F. max.
(5) Heat of Combustion—18,400 B.t.u./lb. min.

It will be noted that the hydrocarbon component may be from about 50 to 90 wt. percent of the fuel compositions.

The combustible solid is to be selected from the class of solids consisting of carbon, magnesium and aluminum. Of this class, the preferred members are magnesium and aluminum. Magnesium is especially preferred since, among other things, it provides a very high heat of combustion per pound of oxygen consumed. In general, the solid component may comprise up to about 45 wt. percent of the fuel compositions.

It is preferred that the combustible solid have an average particle size not larger than about 200 microns. It is particularly preferred that the solid have a particle size not larger than about 175 microns.

At the present time, there appears to be no limit as to how small the particles of combustible solid may be. For example, particles as small as 10 to 50 millimicrons may be readily employed.

In general, any particulate form of carbon having a structure index less than about 200 such as graphite, coal, coke, petroleum coke, high modulus furnace blacks, thermal blacks, etc., may be used as the combustible solid. Particularly effective are the high modulus furnace blacks with a structure index of about 160, especially those having a particle size of about 10 millimicrons to 175 microns, and preferably about 30 to 60 millimicrons.

When aluminum is employed as the combustible solid, it is preferred that it have a particle size of about 10 millimicrons to 175 microns, and especially about 10 to 60 microns.

Preferred for use as the solid component is magnesium, particularly with a particle size of about 10 microns to 175 microns. It is considered that magnesium of about 30 microns to 90 microns particle size is especially satisfactory. The amount of magnesium contained in any given fuel composition may be as much as about 45 wt. percent of the total fuel, but it is preferably about 25 to 40%.

As described earlier, the structure black component of the present fuel compositions is the component that provides the compositions with consistency, uniformity and stability. Structure blacks are carbon blacks that are characterized by an apparent reticular structure, as observed under the high-power electron microscope. They have been described and defined in an article by Sweitzer and Goodrich in "Rubber Age" for August 1944, page 469, and especially page 470, as having an abnormally high structure index. This index is a measure of the oil absorption capacity of carbon black. In the fuel compositions of the present invention it is necessary that the structure black component have a structure index of at least about 200 and preferably about 300. Thus, in the present description structure blacks or high structure index blacks are blacks with a structure index of at least about 200. Low structure index blacks are those with a structure index less than 200.

Included among the structure blacks are various channel blacks prepared from natural gas. Acetylene black with a structure index of about 300 is a particularly effective structure black in the present fuel compositions. It may have an average particle size of about 30 to 60 millimicrons and is particularly effective in the compositions in concentrations above 4% but below about 10% by weight. Excellent fuels are obtained with acetylene black concentrations of about 5 to 7 wt. percent and magnesium concentrations of 5 to 40 wt. percent in liquid fuel-type hydrocarbons boiling in the range of about 130° to 600° F.

Other structure blacks such as the channel blacks have a somewhat lower structure index than acetylene black. When using these lower index blacks, it therefore becomes necessary to use greater amounts of them in the present fuel compositions than one would use acetylene black to obtain the desired fuel structures. For example, it may be necessary to use up to 10 to 15% or more by weight of some channel blacks (based on the overall fuel compositions) to achieve the degree of thickening desired.

An attractive feature of the present invention is the fact that the desired fuel compositions may be easily prepared by using conventional mixing equipment and atmospheric temperature. Also attractive is the fact that the fuel compositions produced are completely combustible and that their structural stability is limited only by the volatility characteristics of the hydrocarbon component.

All of these properties make these compositions ideal for use as jet aircraft fuels and particularly as "afterburner" fuels in turbo-jet and turbo-prop type planes. Their high ash content resulting from combustion of the magnesium and/or aluminum somewhat lessens their value insofar as their use as fuels within the combustion sections of turbo-type planes is concerned. The deposition of ash particles on the internal parts of the turbine sections could possibly result in undesirable consequences.

The present compositions, especially those containing magnesium and aluminum particles, are also admirably suited for use in rocket fuels that contain hydrocarbon components. In this connection, it will be noted that a rocket engine differs from a jet-type engine primarily in the fact that the former must carry its own source of oxygen. Accordingly, rockets are conventionally provided with a combustible fuel composed of petroleum hydrocarbons boiling in the range of 130 to 700° F. and a source of oxygen such as $H_2O_2$, $HNO_3$, liquid oxygen, potassium permanganate, and the like.

The following table illustrates the physical and thermodynamic properties of fuel compositions that contain the three components defined in the present invention. The table also illustrates the fact that the fuel compositions, to be satisfactory, must contain these components in certain critical amounts. This criticality is especially true of the structure carbon black component.

It will be noted that the hydrocarbon component in each one of the fuel compositions was actually a conventional JP-3 type jet fuel meeting Specification No. MIL-F-5624A. The structure black (i.e. high structure index black) was acetylene black, while the low structure index black was a high modulus furnace black having an average particle size of about 50 to 80 millimicrons. The magnesium powder used in fuel samples II–VI appeared to have an average particle size of about 100 to 200 mesh, while the magnesium in samples VII–IX was about 60 to 80 mesh.

*Physical and thermodynamic properties of fuel compositions*

| | Sample No. | | | | | | | |
|---|---|---|---|---|---|---|---|---|
| | I | II | III | IV | V | VI | VII | VIII |
| Composition, Wt. Percent: | | | | | | | | |
| JP-3 Fuel | 100 | 70 | 67 | 65 | 64.2 | 81.5 | 65 | 55. |
| Acetylene Black | | 5 | 3 | 5 | 7.0 | 3.5 | 5 | 5. |
| High Modulus Furnace Black | | 20 | | | | | | |
| Magnesium Powder | | 5 | 30 | 30 | 28.8 | 15.0 | 30 | 40. |
| Observations | Liquid | Smooth and Soft. | Mg Settled. | Smooth and Soft. | Smooth and Soft. | Mg Settled. | Smooth | Smooth Compositions |
| Satisfactory for Use | No | Yes | No | Yes | Yes | No | Yes | Yes. |
| Physical Properties: | | | | | | | | |
| Density— | | | | | | | | |
| gms./cc | 0.77 | 0.92 | | 1.23 | 1.36 | | 1.35 | 1.65. |
| lbs./gal | 5.8 | 7.7 | | 10.3 | 11.3 | | 11.3 | 13.8. |
| Penetration, mm./10— | | | | | | | | |
| at 75° F | | 350 | | 393 | 346 | | 441 | 410. |
| at 32° F | | | | 363 | 333 | | | |
| Combustion Properties: | | | | | | | | |
| B.t.u. released/lb. of $O_2$ burned | 5,450 | 5,509 | | 6,294 | 6,216 | | 6,294 | 6,787. |
| Percent Improvement over JP-3 Fuel | | 1.1 | | 15.5 | 14 | | 15.5 | 24.5. |
| Lbs. Comp./lb. $O_2$ burned | 0.294 | 0.323 | | 0.394 | 0.388 | | 0.394 | 0.440. |
| Percent Improvement over JP-3 Fuel | | 10 | | 34 | 32 | | 34 | 50. |
| Gallons of Composition burned/lb. of $O_2$ burned | 0.051 | 0.042 | | 0.038 | 0.034 | | 0.035 | 0.032. |
| Percent Improvement over JP-3 Fuel | | 18 | | 26 | 33 | | 31 | 37. |

| | Sample No. | | | | | | |
|---|---|---|---|---|---|---|---|
| | IX | X | XI | XII | XIII | XIV | XV |
| Composition, Wt. Percent: | | | | | | | |
| JP-3 Fuel | 45 | 65 | 90 | 85 | 85 | 75 | 55. |
| Acetylene Black | 5 | 5 | 10 | 15 | | 5 | 5. |
| High Modulus Furnace Black | | | | | 15 | 20 | 40. |
| Magnesium Powder | 50 | 30 | | | | | |
| Observations | Too Hard | Excellent and Smooth Composition. | Bled Slightly. | Too Hard | Carbon Settled. | Bled Slightly. | Hard, Crumbly. |
| Satisfactory for Use | No | Yes | Yes | No | No | Yes | No. |
| Physical Properties: | | | | | | | |
| Density— | | | | | | | |
| gms./cc | | 0.91 | 0.80 | | | 0.88 | |
| lbs./gal | | 7.5 | 6.7 | | | 7.3 | |
| Penetration, mm./10— | | | | | | | |
| at 75° F | | 333 | 348 | | | 393 | |
| at 32° F | | | | | | | |
| Combustion Properties: | | | | | | | |
| B.t.u. released/lb. of $O_2$ burned | | 5,420 | 5,398 | | | 5,380 | |
| Percent Improvement over JP-3 Fuel | | −0.6 | −1.0 | | | −1.5 | |
| Lbs. Comp./lb. $O_2$ burned | | 0.323 | 0.300 | | | 0.310 | |
| Percent Improvement over JP-3 Fuel | | 10 | 2 | | | +5 | |
| Gallons of Composition burned/lb. of $O_2$ burned | | 0.043 | 0.045 | | | 0.043 | |
| Percent Improvement over JP-3 Fuel | | 16 | 11 | | | 16 | |

The data in the above table demonstrate that the fuel compositions of the present invention must contain more than 3% by weight of acetylene black but also less than 10% to be satisfactory from the standpoint of physical structure, stability and uniformity. It will be appreciated that other structure blacks possessing smaller structure indices than acetylene black may be employed in somewhat larger amounts than acetylene black without causing excessive hardening or crumbling of the fuel compositions. As mentioned earlier, however, these structure blacks all should have a structure index of at least 200.

It is apparent that the value of the fuel compositions increases with increasing magnesium content up to the level of 50% magnesium. At this level, the fuel would be too hard to pump readily. Particularly desirable are the fuels containing about 5% acetylene black and 30–40% magnesium.

It will be realized that other agents may be added to the fuel compositions of the present invention without departing from the spirit or scope of the invention. For example, oxidation inhibitors, ignition promoters, etc., may be employed.

It will also be realized that any of the combustible solids described herein may be used singly or in combination, although magnesium is preferred to either aluminum or carbon. In this connection, it is contemplated that other combustible solids and especially powdered boron may find application in the present fuels.

The hydrocarbon component of the present fuels may consist of paraffins, naphthenes, aromatics or olefins. Furthermore, the compositions, while they are particularly adapted for use in jet engines and rocket engines, may be employed as fuels in other forms of apparatus.

The hydrocarbon component of the present fuels may also contain residual hydrocarbons of the type that occur in residual petroleum fuel fractions. It will be noted that such fractions generally contain ash-forming constituents such as silicon, lead, copper, iron, vanadium, etc. When vanadium is present, it is particularly contemplated that the fuels of the present invention contain at least 2.5 mols of magnesium per mol of vanadium in order to eliminate corrosive effects that are occasioned by the oxide of the latter element at temperatures in excess of about 1400° F.

What is claimed is:

1. A fuel composition adapted to be burned in a jet-propelled aircraft which comprises 50 to 90 wt. percent of a petroleum hydrocarbon fuel fraction boiling between about 130° and 600° F., about 5 to 40 wt. percent of a combustible solid comprising magnesium which has an average particle size not larger than about 175 microns, and carbon with a structure index of less than 200, and from 4 to 10 wt. percent of an acetylene carbon black with a structure index of at least 200 and with an average particle size of about 30 to 60 millimicrons.

2. A fuel composition adapted for use in jet-type engine afterburners and rocket engines which comprises 50–95 weight percent of a petroleum fuel fraction boiling up to about 600° F., 25–40 weight percent of magnesium having a particle size of about 10–175 microns and less than 10 weight percent of acetylene black sufficient to impart a gel-like structure to the composition with a penetration above about 350 mm./10 at 77° F.

3. A fuel composition for jet-type engine afterburners and rocket engines which comprises about 50 to 90 weight percent of a petroleum fuel fraction boiling from about 130° to 600° F., about 5 to 40 weight percent of magnesium having a particle size of about 30–90 microns, and about 5–7 weight percent of acetylene black.

4. A fuel composition comprising about 50 to 90 weight percent of a petroleum fraction boiling from about 130° to 600° F., up to about 45 weight percent of aluminum having a particle size of about 10 millimicrons to 175 microns, and about 4 to 10 weight percent of acetylene black.

5. A fuel composition comprising about 65 weight percent of hydrocarbons boiling within the range of about 130 to 600° F., about 30 weight percent of a high modulus furnace black having an average particle size of about 50–80 millimicrons and about 5 weight percent of acetylene black.

References Cited in the file of this patent

UNITED STATES PATENTS 2,530,493   Van Loenen _____ Nov. 21, 1950

OTHER REFERENCES

Sweitzer et al.: "The Rubber Age," vol. 55, No. 5, August 1944, pages 469–478.